US012739354B2

(12) United States Patent
Cao et al.

(10) Patent No.: US 12,739,354 B2
(45) Date of Patent: Sep. 15, 2026

(54) SYNCHRONIZING IMAGE SIGNAL PROCESSING ACROSS MULTIPLE IMAGE SENSORS

(71) Applicant: Apple Inc., Cupertino, CA (US)

(72) Inventors: Renbo Cao, San Jose, CA (US); Yonghui Zhao, San Jose, CA (US); Yingjun Bai, San Jose, CA (US); Christophe Seyve, Saratoga, CA (US); Henryk K Blasinski, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 179 days.

(21) Appl. No.: 18/583,729

(22) Filed: Feb. 21, 2024

(65) Prior Publication Data

US 2024/0388683 A1 Nov. 21, 2024

Related U.S. Application Data

(60) Provisional application No. 63/503,136, filed on May 18, 2023.

(51) Int. Cl.
*H04N 13/133* (2018.01)
*H04N 13/15* (2018.01)
(Continued)

(52) U.S. Cl.
CPC ........... *H04N 13/133* (2018.05); *H04N 13/15* (2018.05); *H04N 13/161* (2018.05); *H04N 13/167* (2018.05); *H04N 13/339* (2018.05)

(58) Field of Classification Search
CPC .... H04N 13/133; H04N 13/15; H04N 13/161; H04N 13/167; H04N 13/339;
(Continued)

(56) References Cited

U.S. PATENT DOCUMENTS 7,512,262 B2 3/2009 Criminisi et al.
7,991,228 B2 8/2011 Blake et al.
(Continued)

FOREIGN PATENT DOCUMENTS

CN 103593641 A 2/2014
CN 111970405 A 11/2020
WO 2023013879 A1 2/2023

OTHER PUBLICATIONS

Lin Daw-Tung et al., "Real-Time Active Tampering Detection of Surveillance Camera and Implementation on Digital Signal Processor", 2012 Eighth International Conference on Intelligent Information Hiding and Multimedia Signal Processing, 2012, pp. 383-386, IEEE.

*Primary Examiner* — Abhishek Sarma
(74) *Attorney, Agent, or Firm* — Treyz Law Group; Jason Tsai

(57) ABSTRACT

An apparatus can include a first image sensor having a first field of view (FOV) and configured to capture a first image, a second image sensor having a second FOV and configured to capture a second image, an image statistics collection subsystem configured to gather first image statistics information associated with the first image and to gather second image statistics information associated with the second image, a disparity detection subsystem configured to compare the first image statistics information with the second image statistics information, and image signal processing blocks configured to synchronize processing of the first and second images based on the comparison of the first image statistics information with the second image statistics information. Processing of the first and second images can involve using one or more combined image signal processing control parameters based on image statistics information within an overlapping FOV and/or a within a total FOV.

31 Claims, 6 Drawing Sheets

(51) Int. Cl.
*H04N 13/161* (2018.01)
*H04N 13/167* (2018.01)
*H04N 13/339* (2018.01)

(58) Field of Classification Search
CPC ...... H04N 17/002; H04N 23/67; H04N 23/45; H04N 23/81; H04N 23/10; H04N 23/11; H04N 23/71; H04N 23/73; H04N 23/76; H04N 13/239; H04N 13/243; H04N 5/10; H04N 17/00; H04N 23/64; H04N 23/88; G02B 2027/0138; G02B 27/017
See application file for complete search history.

(56) References Cited

U.S. PATENT DOCUMENTS

| | | | |
|---|---|---|---|
| 8,300,085 | B2 | 10/2012 | Yang et al. |
| 10,210,660 | B2 | 2/2019 | Cabral et al. |
| 11,706,375 | B2 | 7/2023 | Mathur et al. |
| 2011/0064327 | A1 | 3/2011 | Dagher et al. |
| 2014/0368422 | A1 | 12/2014 | Gupta et al. |
| 2015/0163400 | A1 | 6/2015 | Geiss et al. |
| 2016/0295097 | A1 | 10/2016 | Shanmugavadivelu et al. |
| 2017/0272644 | A1 | 9/2017 | Chou et al. |
| 2018/0012078 | A1 | 1/2018 | Pournaghi et al. |
| 2018/0176483 | A1 | 6/2018 | Knorr et al. |
| 2019/0208111 | A1 | 7/2019 | Wendel et al. |
| 2019/0362515 | A1 | 11/2019 | Ciurea et al. |
| 2020/0396363 | A1 | 12/2020 | Wang |
| 2020/0396367 | A1 | 12/2020 | Segapelli et al. |
| 2023/0013539 | A1 | 1/2023 | Holland |

SYNCHRONIZING IMAGE SIGNAL PROCESSING ACROSS MULTIPLE IMAGE SENSORS

This application claims the benefit of U.S. Provisional Patent Application No. 63/503,136, filed May 18, 2023, which is hereby incorporated by reference herein in its entirety.

FIELD

This relates generally to electronic devices, and, more particularly, to electronic devices such as head-mounted devices.

BACKGROUND

Electronic devices such as head-mounted devices may have cameras for capturing a video feed of an external scene and one or more displays for presenting the captured video feed of the scene to a user. Head-mounted devices can include hardware or software subsystems for processing the video feed, such as hardware/software subsystems for applying image quality adjustments on the captured video feed.

It can be challenging to design a head-mounted device having multiple cameras. If care is not taken, the images captured using the multiple cameras can have mismatched settings. Displaying images with mismatched settings to the user can cause visual discomfort. It is within such context that the embodiments herein arise.

SUMMARY

An electronic device such as a head-mounted device may include one or more cameras for capturing a video feed of a real-world environment and one or more displays for presenting a passthrough video feed to a user. The electronic device may include processing circuitry for performing one or more processing functions on the captured video feed to generate the passthrough video feed.

An aspect of the disclosure provides a method of operating an electronic device having at least first and second image sensors, the method including capturing a first image using the first image sensor having a first field of view, capturing a second image using the second image sensor having a second field of view different than the first field of view, determining whether the first image sensor is currently occluded, and synchronizing processing of the first and second images by using information associated with the second image to process the first and second images in response to determining that the first image sensor is currently occluded. The method can further include displaying the first processed image using a first display in the electronic device and displaying the second processed image using a second display in the electronic device.

Operations for determining whether the first image sensor is currently occluded can include comparing thumbnail information associated with the first image with thumbnail information associated with the second image, comparing brightness information associated with the first image with brightness information associated with the second image, comparing color information associated with the first image with color information associated with the second image, comparing focus information associated with the first image with focus information associated with the second image, and/or comparing a first integration time associated with the first image with a second integration time associated with the second image. Operations for synchronizing processing of the first and second images can include synchronizing auto exposure of the first and second images using brightness information associated with the second image, synchronizing auto white balance of the first and second images using color information associated with the second image, synchronizing tone mapping of the first and second images using histogram information associated with the second image, and/or synchronizing one or more additional image signal processing functions of the first and second images using pixel information associated with the second image.

An aspect of the disclosure provides a method of operating an electronic device having at least first and second image sensors, the method including: capturing a first image using the first image sensor having a first field of view; capturing a second image using the second image sensor having a second field of view different than the first field of view, where the first field of view and the second field of view coincide in an overlapping field of view (FOV) area; and processing the first and second images using one or more combined image signal processing control parameter computed based on information associated with the first image within the overlapping FOV area and information associated with the second image within the overlapping FOV area. The method can include promoting color, tone mapping, brightness, and/or noise matching between the first and second images. The method can include spatially matching on a per pixel level and/or globally matching for an entire image. The method can further include processing the first and second images using an additional combined image signal processing control parameter computed based on information associated with the first and second images within a total field of view (FOV) area equal to a union of the first field of view and the second field of view.

An aspect of the disclosure provided an apparatus that includes a first image sensor having a first field of view and configured to capture a first video feed, a second image sensor having a second field of view different than the first field of view and configured to capture a second video feed, an image statistics collection subsystem configured to gather first image statistics information associated with the first video feed and to gather second image statistics information associated with the second video feed, an image capture disparity detection subsystem configured to compare the first image statistics information with the second image statistics information, and a plurality of image signal processing blocks configured to synchronize processing of the first and second video feeds based on the comparison of the first image statistics information with the second image statistics information.

DETAILED DESCRIPTION

Figure 1:
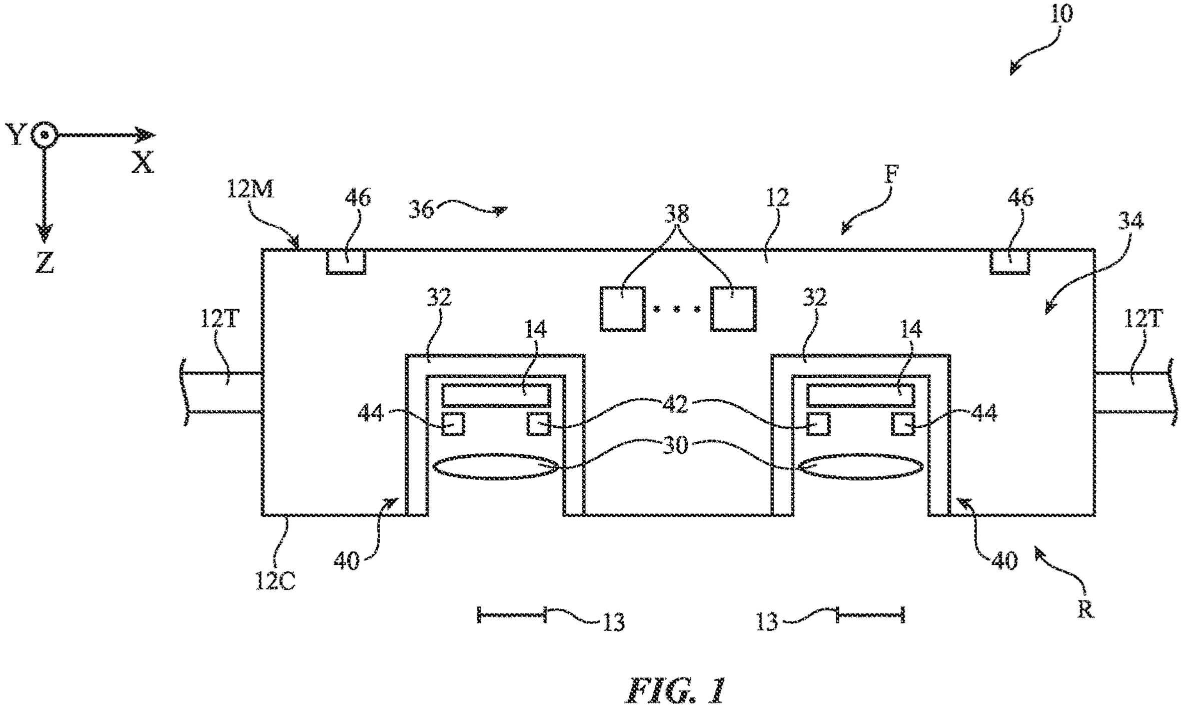
FIG. 1 is a top view of an illustrative head-mounted device in accordance with some embodiments.

A top view of an illustrative head-mounted device is shown in FIG. 1. As shown in FIG. 1, head-mounted devices such as electronic device 10 may have head-mounted support structures such as housing 12. Housing 12 may include portions (e.g., head-mounted support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., a head-mounted housing such as main housing portion 12M) of housing 12 may support electronic components such as displays 14.

Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures, and these rigid walls may optionally be covered with electrical components, fabric, leather, or other soft materials, etc. Housing portion 12M may also have internal support structures such as a frame (chassis) and/or structures that perform multiple functions such as controlling airflow and dissipating heat while providing structural support.

The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, spectacles, a hat, a mask, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have one or more cameras such as cameras 46 of FIG. 1. Cameras 46 that are mounted on front face F and that face outwardly (towards the front of device 10 and away from the user) may sometimes be referred to herein as forward-facing or front-facing cameras. Cameras 46 may capture visual odometry information, image information that is processed to locate objects in the user's field of view (e.g., so that virtual content can be registered appropriately relative to real-world objects), image content that is displayed in real time for a user of device 10, and/or other suitable image data. For example, forward-facing (front-facing) cameras may allow device 10 to monitor movement of the device 10 relative to the environment surrounding device 10 (e.g., the cameras may be used in forming a visual odometry system or part of a visual inertial odometry system). Forward-facing cameras may also be used to capture images of the environment that are displayed to a user of the device 10. If desired, images from multiple forward-facing cameras may be merged with each other and/or forward-facing camera content can be merged with computer-generated content for a user.

Device 10 may have any suitable number of cameras 46. For example, device 10 may have K cameras, where the value of K is at least one, at least two, at least four, at least six, at least eight, at least ten, at least 12, less than 20, less than 14, less than 12, less than 10, 4-10, or other suitable value. Cameras 46 may be sensitive at infrared wavelengths (e.g., cameras 46 may be infrared cameras), may be sensitive at visible wavelengths (e.g., cameras 46 may be visible cameras), and/or cameras 46 may be sensitive at other wavelengths. If desired, cameras 46 may be sensitive at both visible and infrared wavelengths.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure such as support structure 32. Support structure 32, which may sometimes be referred to as a lens support structure, optical component support structure, optical module support structure, or optical module portion, or lens barrel, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 or other light-emitting devices such as lasers, lamps, etc. Cameras 42 and light-emitting diodes 44 may operate at any suitable wavelengths (visible, infrared, and/or ultraviolet). As an example, diodes 44 may emit infrared light that is invisible (or nearly invisible) to the user. This allows eye monitoring operations to be performed continuously without interfering with the user's ability to view images on displays 14.

Figure 2:
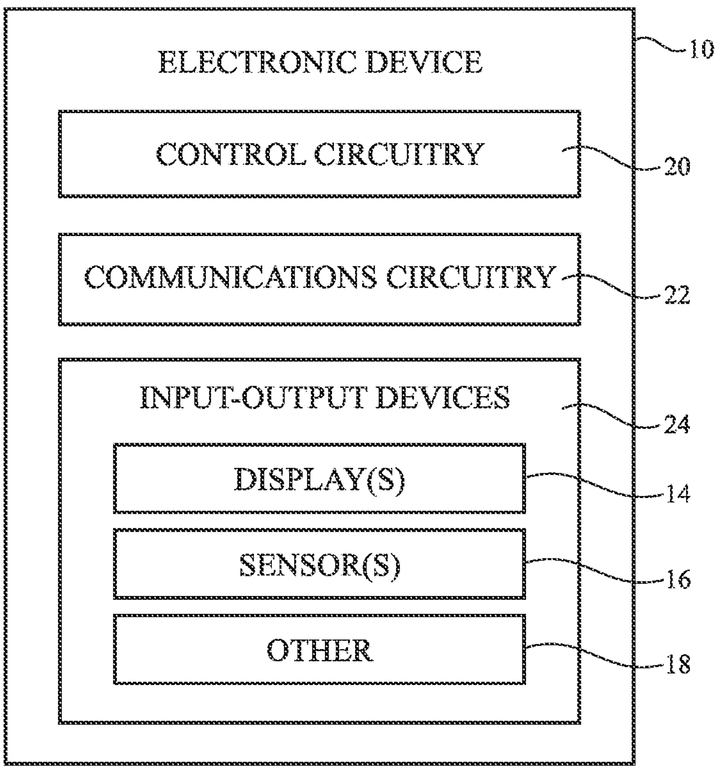
FIG. 2 is a schematic diagram of an illustrative electronic device in accordance with some embodiments.

A schematic diagram of an illustrative electronic device such as a head-mounted device or other wearable device is shown in FIG. 2. Device 10 of FIG. 2 may be operated as a standalone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 2.

As shown in FIG. 2, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. One or more processors in control circuitry 20 may be used to gather input from sensors and other input devices and may be used to control output devices. The processing circuitry may be based on one or more processors such as microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output. Control circuitry 20 may be configured to perform operations in device 10 using hardware (e.g., dedicated hardware or circuitry), firmware, and/or software. Software code for performing operations in device 10 may be stored on storage circuitry (e.g., non-transitory (tangible) computer readable storage media that stores the software code). The software code may sometimes be referred to as program instructions, software, data, instructions, or code. The stored software code may be executed by the processing circuitry within circuitry 20.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device or a controller, computer stylus, or other input device, speakers or other output devices, etc.) over a wireless link.

For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output. Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras), fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion of device 10 and/or information about a pose of a user's head (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, three-dimensional camera systems such as depth sensors (e.g., structured light sensors and/or depth sensors based on stereo imaging devices that capture three-dimensional images) and/or optical sensors such as self-mixing sensors and light detection and ranging (lidar) sensors that gather time-of-flight measurements (e.g., time-of-flight cameras), humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

To help protect the privacy of users, any personal user information that is gathered by sensors may be handled using best practices. These best practices including meeting or exceeding any privacy regulations that are applicable. Opt-in and opt-out options and/or other options may be provided that allow users to control usage of their personal data.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Display(s) 14 can be used to present a variety of content to a user's eye. The left and right displays 14 that are used to present a fused stereoscopic image to the user's eyes when viewing through eye boxes 13 can sometimes be referred to collectively as a display 14. As an example, virtual reality (VR) content can be presented by display 14. Virtual reality content may refer to content that only includes virtual objects within a virtual reality (computer-generated) environment. As another example, mixed reality (MR) content can be presented by display 14. Mixed reality content may refer to content that includes virtual objects and real objects from the real-world physical environment in which device 10 is being operated. As another example, only real-world content can be presented by display 14. The real-world content may refer to images being captured by one or more front-facing cameras (see, e.g., cameras 46 in FIG. 1) and passed through as a live feed to the user. The real-world content being captured by the front-facing cameras is therefore sometimes referred to as a camera passthrough feed, a (live) video passthrough feed, or a passthrough video feed (stream).

A physical environment refers to a physical world that people can sense and/or interact with without the aid of an electronic device. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics.

Although electronic device 10 of FIG. 1 and FIG. 2 are sometimes referred to herein as a head-mounted electronic device, the embodiments disclosed herein need not be limited to a head-mounted device or a wearable device. In some embodiments, device 10 of FIG. 2 may be formed as part of a larger system having multiple outward facing cameras. As an example, device 10 may be formed as part of a self-driving vehicle with multiple cameras and/or sensors.

Figure 3:
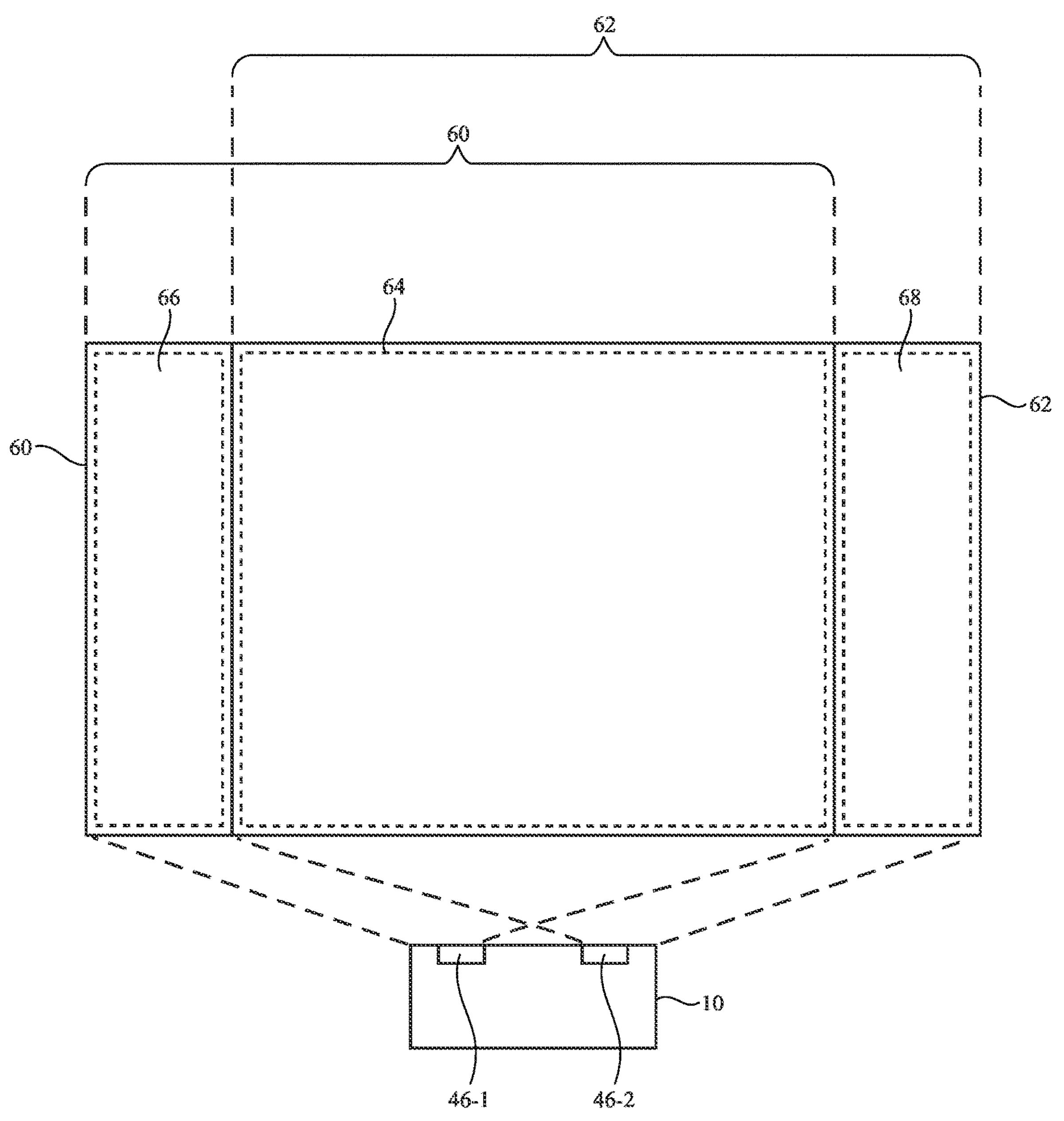
FIG. 3 is a diagram showing how the electronic device shown in FIG. 1 or FIG. 2 can be used to capture at least two images with partially overlapping fields of view in accordance with some embodiments.

FIG. 3 is a diagram showing how the electronic device shown in FIG. 1 or FIG. 2 can be used to capture at least two images with partially overlapping fields of view (FOVs). As shown in FIG. 3, device 10 may include at least a first front-facing camera 46-1 and a second front-facing camera 46-2. Cameras 46-1 and 46-2 can be color image sensors (e.g., sensors for acquiring color images of a scene) or monochromatic image sensors (e.g., sensors for acquiring black-and-white or grayscale images of a scene). First image sensor 46-1 can sometimes be referred to as the left (L) scene camera, whereas second image sensor 46-2 can sometimes be referred to as the right (R) scene camera.

First image sensor 46-1 may be configured to capture a first image having a first field of view (FOV) as delineated by box 60, whereas second image sensor 46-2 may be configured to capture a second image having a second FOV as delineated by box 62. The first FOV 60 may be slightly different than the second FOV 62. The first FOV 60 is sometimes referred to as the left FOV, whereas the second FOV 62 is sometimes referred to as the right FOV. The fields of view (FOVs) of the first and second images captured by the two image sensors 46-1 and 46-2 can be at least partially overlapping. As shown in FIG. 3, the first FOV 60 associated with the first image captured by first image sensor 46-1 and the second FOV 62 associated with the second image captured by second image sensor 46-2 can coincide, intersect, or share a common area 64. Area 64 is sometimes referred to and defined herein as an overlapping field of view (FOV) or overlapping FOV area. There may be portions of the left FOV 60 that is non-overlapping with the right FOV 62. For example, at least a leftmost portion (area) 66 of the left FOV 60 does not overlap with the right FOV 62 and may therefore contain information that is not captured by the right image sensor 46-2. Similarly, there may be portions of the right FOV 62 that is non-overlapping with the left FOV 60. For example, at least a rightmost portion (area) 68 of the right FOV 62 does not overlap with the left FOV 60 and may therefore contain information that is not captured by the left image sensor 46-1. The union of the first FOV 60 and the second FOV 62, which is identical to the union of overlapping FOV area 64 and non-overlapping FOV areas 66 and 68, may be referred to and defined herein as the total FOV area.

It can be challenging to design an electronic device 10 having multiple image sensors. If care is not taken, the images captured from the multiple image sensors can have mismatched settings. Displaying images with mismatched settings to the user can cause visual discomfort. It would therefore be desirable to synchronize the images captured from the multiple image sensors, so that the user's eyes are not presented with images with conflicting image settings.

Figure 4:
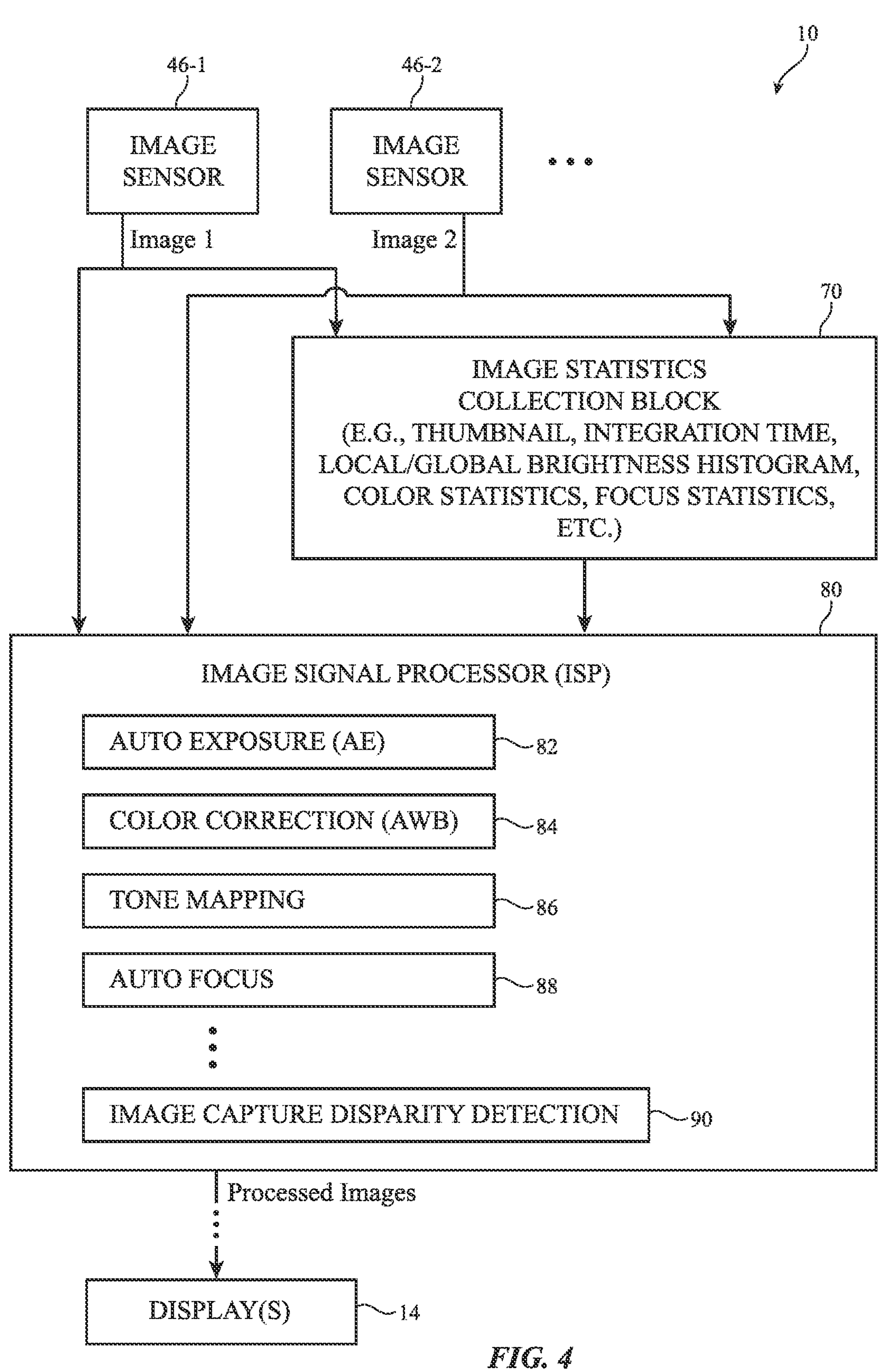
FIG. 4 is a diagram of an illustrative electronic device having multiple image sensors coupled to an image statistics collection block and an image signal processor in accordance with some embodiments.

FIG. 4 is a diagram of illustrative electronic device 10 having multiple cameras such as image sensors 46-1 and 46-2 coupled to one or more subsystems configured to synchronize image signal processing control parameters to generate harmonized videos or images from the multiple image sensors. As shown in FIG. 4, image sensor 46-1 may be configured to acquire or capture first images of a given scene (sometimes referred to collectively as a first video feed) while image sensor 46-2 may be configured to acquire or capture second images of the given scene (sometimes referred to collectively as a second video feed).

The example of FIG. 4 in which device 10 includes two image sensors 46-1 and 46-2 for capturing multiple video feeds to be displayed is illustrative. In general, device 10 can include two or more image sensors 46 for capturing at least two video feeds to be synchronized, two to five image sensors 46 for capturing up to five video feeds to be synchronized, five to ten image sensors 46 for capturing up to ten video feeds to be synchronized, 10 to 20 image sensors 46 for capturing up to 20 video feeds to be synchronized, or more than 20 image sensors 46 for capturing more than 20 video feeds to be synchronized. Illustrative configurations in which images from two image sensors 46-1 and 46-2 are being synchronized are sometimes described herein as an example.

Image sensor 46-1 may output a first image (see Image 1) to an image statistics collection subsystem such as image statistics collection block 70 and also to an image signal processing circuit such as image signal processor (ISP) 80. Similarly, image sensor 46-2 may output a second image (see Image2) to image statistics collection block 70 and also to image signal processor 80. The first and second images output directly from the image sensors are sometimes referred to as unprocessed, straight-out-of-camera (SOOC), or raw images. The first and second images can be analyzed by image statistics collection block 70, which is sometimes referred to as an image statistics analyzer. Image statistics collection block 70 may receive the captured images from the image sensors 46 and analyze the captured images to obtain information relating to the captured images, such as thumbnail information, integration times, brightness histograms, color statistics, focus statistics, and/or other statistical information relating to the captured images. Image statistics collection block 70 can collect image frame statistics from the first and second images independently.

The thumbnail information may include low resolution versions of the first and second images. The integration times may include a first integration time used for acquiring the first image, which can be a function of a shutter speed of image sensor 46-1 and may also include a second integration time used for acquiring the second image, which can be a function of the shutter speed of image sensor 46-2. The brightness histograms can include local and/or global histograms for the first and second images. A brightness histogram plots the frequency of image pixels across a range of possible brightness values. The color statistics for each captured image can include a color histogram (e.g., a graph plotting the distribution of chromaticity value in an image), an average color value (e.g., an average of all the camera red, green, and blue values in an image), and/or other color related information. The focus statistics can include a first focus setting used for capturing the first image and can include a second focus setting used for capturing the second image. The first and second focus settings can be autofocus (AF) settings or manual focus (MF) settings. The focus statistics can also indicate whether an image sensor was able to lock focus. The information collected by image statistics collection block 70 may be referred to collectively as image statistics information.

The image statistics information obtained at image statistics collection block 70 and the raw images output from the image sensors 26 can be fed to image signal processor 80. Image signal processor 80, which is sometimes considered to be part of one of the processors in control circuitry 20 (FIG. 2), is an image processing unit used for processing the raw digital images output from the one or more cameras such as image sensors 46-1 and 46-2 on device 10. Image signal processor 80 can be used to perform a series of post-processing operations on the captured images prior to displaying the images to the user of device 10. Image signal processor 80 may process the raw images to produce corresponding processed images, which can then be presented on one or more display(s) 14. The image statistics collection block 70, image signal processor 80, display(s) 14, and/or other associated subsystems in this signal path are sometimes referred to as being part of a display pipeline. The configuration of FIG. 4 in which the images captured by image sensors 46-1 and 46-2 are shown as being conveyed to a single ISP 80 is exemplary. In other embodiments, the images captured from the multiple image sensors can be fed to separate image signal processors 80 (e.g., the first images captured by sensor 46-1 can be processed using a first ISP 80, whereas the second images captured by sensor 46-2 can be processed using a second ISP 80).

As shown in the example of FIG. 4, image signal processor 80 may include an automatic exposure (AE) block 82 for controlling an exposure setting for the captured images, a color correction block 84 (sometimes referred to as an automatic white balance or AWB block) for controlling a white balance setting for the captured images, a tone mapping block 86 (e.g., a global tone mapping block for globally controlling a tone curve setting for the captured images and/or a local tone mapping block for locally controlling the tone curve setting for one or more portions of the captured images), an autofocus (AF) block 88 for controlling focus settings used for capturing the images, and other image signal processing blocks. The other image signal processing blocks in ISP 80, which are not explicitly shown in FIG. 4 to avoid obscuring the present embodiments, can include a gamma correction block for controlling a gamma curve setting for the images, a shading correction block for controlling how the image sensors correct for regional brightness variations in the captured images, a noise reduction block for controlling how the image sensors reduce noise in the captured images, a black level adjustment block for controlling black level settings for the image sensors, a demosaicing block for controlling how the image sensors reconstructs full color images from a Bayer color pattern (as an example), an image sharpening block, a high dynamic range (HDR) correction block, a facial recognition block for detecting faces in a scene, an automatic scene recognition block for recognizing different types of scenery, a lens correction block for correcting lens shading issues, lens vignetting, and lens distortion, a color space conversion block for converting an RGB signal to other color spaces (if desired), and/or other image signal processing blocks. These individual blocks within ISP 80 can be configured to run their own image processing algorithm and are sometimes referred to collectively as image signal processing blocks.

In some embodiments, the first image captured by image sensor 46-1 can be processed using ISP 80 and presented on a first (left) display 14 of device 10, whereas the second image captured by image sensor 46-2 can be processed using ISP 80 and presented on a second (right) display 14 (see, e.g., FIG. 1). The image signal processing blocks (e.g., blocks 82, 84, 86, 88, etc.) of ISP 80 should apply the same image adjustments to the first and second images to ensure that the processed images output on the left and right displays 14 appear harmonious to the user. The image adjustments or settings that are applied to the first and second images may be determined based on the image statistics information gathered by image statistics collection block 70. The image statistics information of the first and second images, however, may not always be the same and may in certain instances, be drastically different.

To detect such differences in the image statistics between the first and second images, ISP 80 may be provided with a disparity detection subsystem such as image capture disparity detection block 90. Image capture disparity detection block 90 can be configured to detect differences or errors between the first and second images or video feeds and can further be configured to use image statistics associated with a selected one of the first and second images to adjust both images simultaneously. The image adjustments or settings such as autoexposure settings, color correction (AWB) settings, tone mapping settings, and/or other control parameters being applied to the captured images during the operations of ISP 80 to ensure that the first and second images are properly matched are sometimes referred to collectively as "image signal processing control parameters." Image capture disparity detection block 90 may therefore facilitate with synchronizing image signal processing control parameters between the left and right images captured by image sensors 46-1 and 46-2. The example of FIG. 4 in which disparity detection block 90 is shown as being part of ISP 80 is merely illustrative. In other embodiments, image capture disparity detection block 90 can be considered to be part of image statistics collection block 70, can be considered to be part of control circuitry 20 in FIG. 2, or can be considered a standalone block separate from block 70 and ISP 80.

Figure 5:
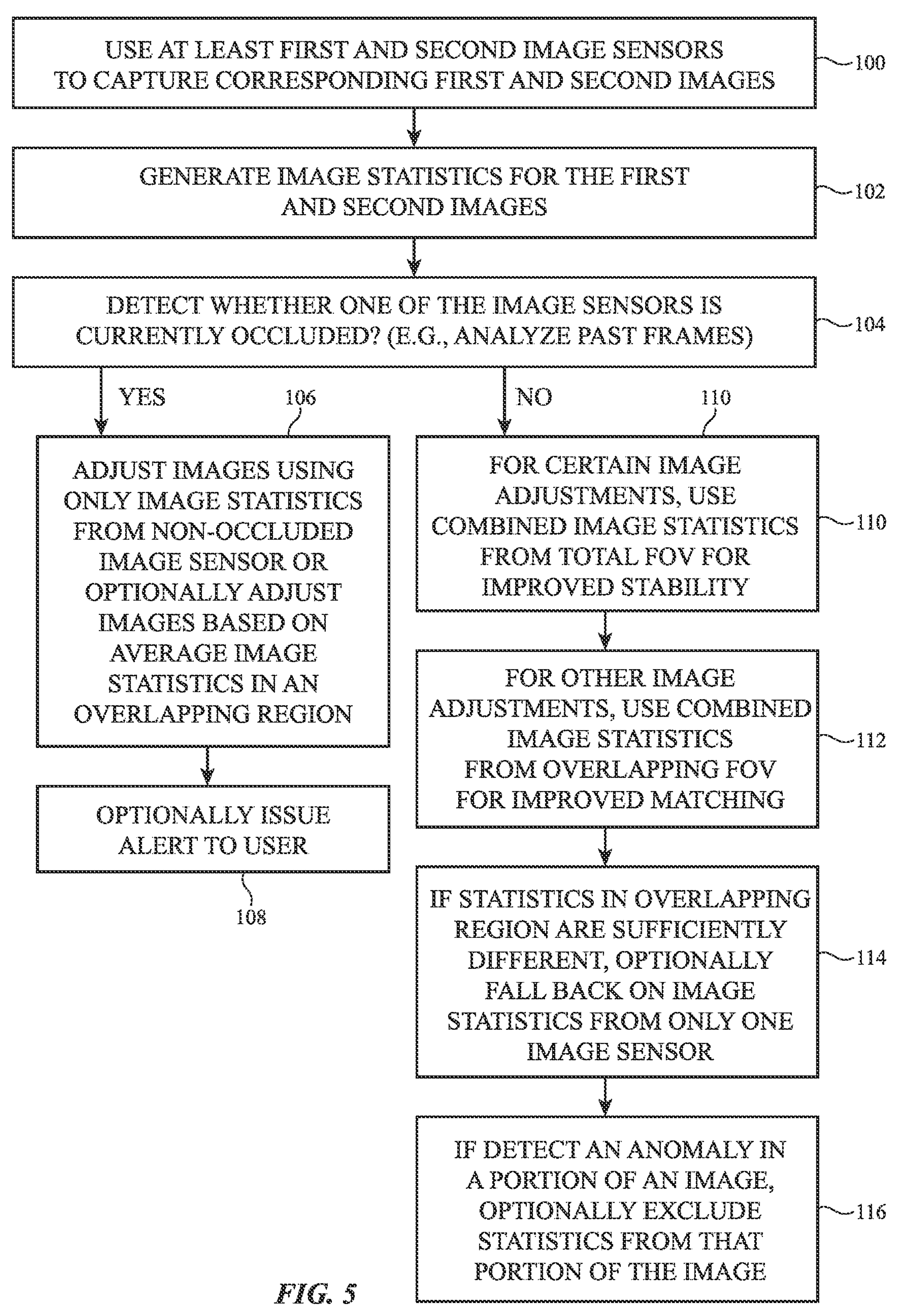
FIG. 5 is a flow chart of illustrative steps for operating an electronic device of the type shown in FIG. 4 in accordance with some embodiments.

FIG. 5 is a flow chart of illustrative steps for operating an electronic device 10 of the type described in connection with FIG. 4. During the operations of block 100, the multiple cameras within device 10 can be configured to capture corresponding images or video frames. For example, the first (left) image sensor 46-1 can be used to acquire a first image associated with a first field of view (see FOV 60 in FIG. 3), whereas the second (right) image sensor 46-2 can be used to acquire a second image associated with a second field of view (see FOV 62 in FIG. 3). The fields of view of the image sensors 46-1 and 46-2 are at least partially overlapping (e.g., see overlapping FOV area 64 in FIG. 3).

During the operations of block 102, the captured images can be fed to image statistics collection block 70 and image statistics collection block 70 can generate image statistics information about the captured images. For example, image statistics collection block 70 can generate a first thumbnail of the first image, identify a first integration time for the first image, obtain a local/global brightness histogram of the first image, obtain color statistics information associated with the first image, and obtain focus statistics information associated with the first image. Similarly, image statistics collection block 70 can generate a second thumbnail of the second image, identify a second integration time for the second image, obtain a local/global brightness histogram of the second image, obtain color statistics information associated with the second image, and obtain focus statistics information associated with the second image. The fields of view of the image sensors 46-1 and 46-2 are at least partially overlapping (e.g., see overlapping FOV area 64 in FIG. 3), so the image statistics information of the first and second images may be similar, identical, or can also be quite different.

Figure 6:
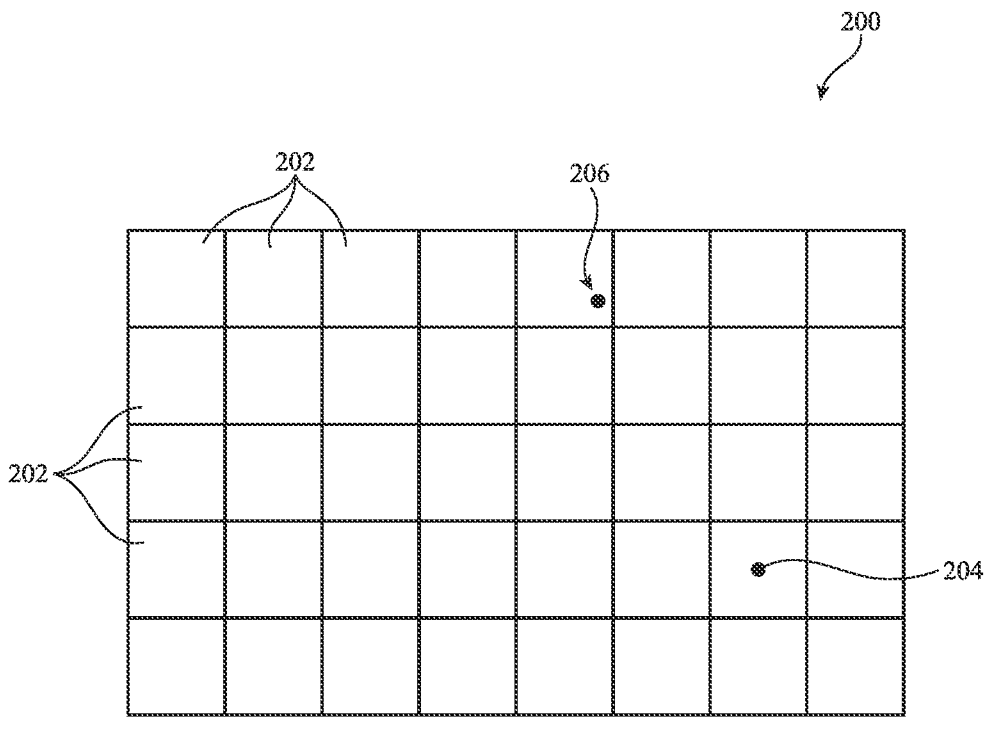
FIG. 6 is a diagram of an illustrative spatial weight map in accordance with some embodiments.

During the operations of block 102, the image statistics of the first and second images can optionally be processed using a spatial weighting map such as spatial weight map 200 of FIG. 6. As shown in FIG. 6, spatial weight map 200 divides an image into a plurality of regions 202. Each region 202 in spatial weight map 200 can be assigned respective weighting values. These weighting values can be applied to the information in corresponding regions of the image to adjust the overall image statistics in a piecewise fashion. Each region 202 can have a square shape, a rectangular shape, or other shape. The example of FIG. 6 in which spatial weight map 200 divides an image into five rows and eight columns of regions 202 is merely illustrative. In general, spatial weight map 200 can be divided into any number of regions 202 of the same size/shape or different size/shape.

As an example, regions 202 closer to the center of the spatial map or image can be assigned a greater weight while regions 202 further away from the center can be assigned progressively lower weights (e.g., regions 202 along the periphery of the image can be assigned the lowest weights). As another example, regions 202 closer to a point of gaze such as point of gaze 204 in the example of FIG. 6 can be assigned a greater weight while regions 202 further away from point 204 can be assigned progressively lower weights. As another example, regions 202 closer to a bright light such as point light source 206 in the example of FIG. 6 can be assigned a greater weight while regions 202 farther away from point 206 can be assigned progressively lower weights or regions 202 corresponding to the darker regions of the image can be assigned the lowest weights. These examples are illustrative. If desired, other weighting heuristics can be employed. The spatial weight map 200 that is applied the image statistics gathered from the left and right images can be the same or can be different.

During the operations of block 104 (referring back to FIG. 5), image capture disparity detection block 90 can be used to detect whether one of the image sensors is currently occluded or obstructed based on the image statistics information of the first and second images. For instance, consider a scenario in which image sensor 46-1 is currently blocked by the user's hand (e.g., the FOV 60 of the left camera is predominately covered by the user's hand, arm, phone, or other obstacle) while image sensor 46-2 is not occluded (e.g., the FOV 62 of the right camera is not blocked by any nearby objects and can properly capture the scene in front of device 10). In such scenario, the first image captured by image sensor 46-1 may be substantially darker than the second image captured by image sensor 46-2. As an example, this disparity can show up in the brightness histograms of the two images (e.g., the brightness histogram of the first image will be skewed to the darker values relative to the brightness histogram of the second image). As another example, this disparity can show up in the thumbnails of the two images (e.g., the thumbnail of the first image will have a much smaller dynamic range and much less scene content relative to the thumbnail of the second image). As another example, this disparity can show up in the integration times of the two images (e.g., the integration time used to capture the first darker image will be substantially longer than the integration time used to capture the second image). As another example, this disparity can show up in the color information of the two images (e.g., the color statistics of the first image might be more subdued relative to the color statistics of the second image). As another example, this disparity can show up in the focus information relating to the two images (e.g., the first image sensor may not be able to achieve focus when it is occluded, whereas the second image sensor would be able to lock focus on a certain portion of the scene assuming the autofocusing function is enabled).

If desired, image capture disparity detection block 90 can optionally compare past (historical) video frames with the current video frame to determine whether a new obstacle has recently entered the field of view of at least one of the image sensors. The example above in which block 90 is used to detect a hand blocking one of the image sensors is merely illustrative. In general, the above techniques can be used to detect whether one of the cameras is covered by mud, to detect lens smear on one of the cameras, and/or to detect other types of occlusions or phenomena that might cause the captured images from one of the cameras to be temporarily erroneous. In yet other embodiments, a near-field object detection component can additionally or alternatively be employed to sense a nearby object such as the user's hand in the vicinity or in the FOV of one or more of the image sensors 46.

In response to determining that one of the image sensors is currently occluded, processing may proceed to block 106. During the operations of block 106, ISP 80 may adjust the first and second images using only image statistics associated with the non-occluded image sensor. As an example, AE block 82 might apply an autoexposure setting based on only the thumbnail information or brightness histogram of the image associated with the non-occluded image sensor to both the first and second images (while completely ignoring the thumbnail information or brightness histogram of the image captured by the occluded image sensor). As another example, AWB block 84 might apply color correction based on only the color histogram of the image associated with the non-occluded image sensor to both the first and second images (while completely ignoring the color histogram of the image captured by the occluded image sensor). As another example, tone mapping block 82 might apply tone curve setting based on only the brightness histogram of the image associated with the non-occluded image sensor to both the first and second images (while completely ignoring the brightness histogram of the image captured by the occluded image sensor). These examples in which the auto exposure, automatic white balancing, and tone mapping settings are synchronized between the first and second images are illustrative. In general, one or more other image signal processing functions within ISP block 80 such as demosaicing and denoising can also be synchronized using pixel information obtained from the non-occluded image sensor.

The examples above in which the image statistics from the occluded image sensor is completely ignored or discarded is illustrative. If desired, ISP 80 may optionally adjust the first and second images based on an average image statistics value of the overlapping FOV area. As an example, the AE block 82 might apply an autoexposure setting based on an average of the thumbnail information or brightness histograms in the overlapping FOV area 64 (see, e.g., FIG. 3) of the two images while ignoring the thumbnail or brightness information in the non-overlapping regions 66 and 68. As another example, AWB block 84 might apply color correction based on an average of the color histograms in the overlapping FOV area 64 of the two images while ignoring the color information in the non-overlapping portions 66 and 68. During the operations of block 108, device 10 may optionally issue a notification alerting the user that one of the image sensors is occluded. The user may then be given an opportunity to remove or eliminate the occlusion (e.g., by moving his/her hand, by turning his/her head in a different direction, by wiping away the mud or lens smear from the occluded camera, etc.).

In certain embodiments, in response to determining that one of the image sensors is currently occluded, a portion of the processed image output from the currently occluded image sensor can be filled by a corresponding portion of the processed image output from the non-occluded image sensor (e.g., the occluded image portion is filled using information from the other image sensor so that the processed image output from the currently occluded image sensor displays a non-black image). The examples described herein in which one of the images include missing information due to an occlusion is exemplary. In other embodiments, such missing information can alternatively or additionally be due to malfunction of one or more components in the image processing pipeline.

Referring back to block 104, in response to determining that none of the image sensors is currently occluded, processing may proceed to block 110. During the operations of block 110, for certain image signal processing control parameters, the combined or fused image statistics from the total FOV area (see, e.g., the union of regions 64, 66, and 68 in FIG. 3) can be taken into account for improved temporal stability. For example, an average value or a weighted sum of the image signal processing control parameters of interest from the total FOV can be computed and applied to both the first and second images. Using a weighted sum of the image signal processing control parameters from the two images can help bias the resulting image towards the information obtained from one of the image sensors. As an example, information from the left image may be given a 60% weighting, whereas information from the right image may be given a 40% weighting. In general, any weighting scheme can be used to blend together the information/statistics from the left and right images. Using information from the total FOV encompasses a maximum amount of scene information, which can be beneficial for certain auto white balancing algorithms such as illuminant estimation (e.g., to estimate the type of light source(s) in a scene). The term "illuminant" may refer to a type of light source that is detected within a scene or captured image. Thus, image signal processing functions such as auto white balancing might benefit from utilizing the lighting information from the combined (total) FOV. The estimated illuminant type can, for example, be a single light source that is used for global white balancing correction for the first and second images. As another example, the estimated illuminant type can include multiple light sources that are used for spatially-varying white balancing correction for the first and second images. At least some of the blocks within ISP 80 can run one or more algorithms that use one or more image signal processing control parameters falling into this category.

During the operations of block 112, for other image signal processing functions, the combined or fused image statistics from the overlapping FOV (see, e.g., area 64 in FIG. 3) can be taken into account for improved color, tone mapping, brightness, and/or noise matching (as examples). For instance, an average value or a weighted sum of the image signal processing control parameters of interest from the overlapping FOV can be computed ad applied to both the first and second images. Using a weighted sum of the image signal processing control parameters from the two images can help bias the resulting image towards the information obtained from one of the image sensors. As an example, information from the left image may be given a 10% weighting, whereas information from the right image may be given a 90% weighting. In general, any weighting scheme can be used to blend together the information/statistics from the left and right images. Using information from only the overlapping FOV area while ignoring the non-overlapping image portions 66 and 68 can be beneficial for certain algorithms such as color matching (e.g., to match the colors of the first and second images). Thus, image signal processing control parameters as color matching parameters might benefit from utilizing only the color information from the overlapping FOV area. At least some of the blocks within ISP 80 can run one or more algorithms involving image signal processing control parameters falling into this category. Matching between the first and second images can include spatially matching on a per pixel level and/or globally matching for the entire image.

During the operations of block 114, if the image statistics of the first and second images in the overlapping FOV area

64 are sufficiently different (e.g., if the difference is greater than a threshold value), ISP 80 may optionally fall back on the image statistics from only one of the image sensors. Here, even though it has been determined that none of the image sensors are occluded, it is still possible for one of the image sensors to output apparently incorrect data. For example, if the right image sensor 46-2 is somehow unable to focus, resulting in the second image to lack sharpness and contrast, ISP 80 might fall back on using only information from the first image and presenting that on both displays 14 to the user. As another example, even if no occlusion has been detected, one image might still somehow be noticeably brighter than the other image based on the brightness histograms. In such scenarios, priority may be given to the brighter image (since brighter images tend to be easier to recover), so ISP 80 may fall back on using only the brightness information from the brighter image and applying that to both images.

During the operations of block 116, if the image capture disparity detection block 90 detects an anomaly in a portion of at least one of the images, ISP 80 may optionally exclude any image statistics information from that portion of the image. For example, ISP 80 can selectively exclude one or more areas of an image from the brightness histogram calculation or the color histogram calculation. The example of FIG. 5 in which blocks 110, 112, 114, and 116 are shown in a particular order is merely illustrative. In general, blocks 110, 112, 114, and 116 can be performed in any desired order or at least some of these blocks can be performed in parallel.

The operations of FIG. 5 are illustrative. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

The methods and operations described above in connection with FIGS. 1-5 may be performed by the components of device 10 using software, firmware, and/or hardware (e.g., dedicated circuitry or hardware). Software code for performing these operations may be stored on non-transitory computer readable storage media (e.g., tangible computer readable storage media) stored on one or more of the components of device 10 (e.g., the storage circuitry within control circuitry 20 of FIG. 1). The software code may sometimes be referred to as software, data, instructions, program instructions, or code. The non-transitory computer readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of device 10 (e.g., one or more processors in control circuitry 20). The processing circuitry may include microprocessors, application processors, digital signal processors, central processing units (CPUs), application-specific integrated circuits with processing circuitry, or other processing circuitry.

Many different types of electronic systems can enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers.

The foregoing is merely illustrative and various modifications can be made to the described embodiments. The foregoing embodiments may be implemented individually or in any combination.

What is claimed is:

1. Circuitry comprising:

one or more inputs configured to receive a first image of an environment from a first image sensor and a second image, different than the first image, of the environment from a second image sensor; and one or more image signal processing circuits configured to:

obtain first image statistics information associated with the first image of the environment;

obtain second image statistics information associated with the second image of the environment;

determine whether the first image sensor is currently occluded by comparing the first image statistics information with the second image statistics information; and synchronize settings associated with the first and second images based on the comparison of the first image statistics information with the second image statistics information in response to determining that the first image sensor is currently occluded.

2. The circuitry of claim 1, wherein synchronizing the settings associated with the first and second images comprises synchronizing image adjustment settings for adjusting the first and second images.

3. The circuitry of claim 2, wherein synchronizing the image adjustment settings for adjusting the first and second images comprises synchronizing one or more of: exposure settings, color correction settings, and tone curve settings for the first and second images.

4. The circuitry of claim 2, wherein synchronizing the settings associated with the first and second images comprises synchronizing image sensor settings for controlling the first and second image sensors.

5. The circuitry of claim 4, wherein synchronizing the image sensor settings for controlling the first and second image sensors comprises synchronizing one or more of: autoexposure (AE) settings, automatic white balancing (AWB) settings, and autofocus (AF) settings for the first and second image sensors.

6. The circuitry of claim 1, wherein determining whether the first image sensor is currently occluded comprises:

comparing one or more of brightness information, thumbnail information, color information, focus information, and first integration time associated with the first image with one or more of brightness information, thumbnail information, color information, focus information, and second integration time associated with the second image.

7. The circuitry of claim 1, wherein the first image has a first field of view and the second image has a second field of view different than the first field of view, wherein the first field of view and the second field of view coincide in an overlapping field of view (FOV) area, and wherein the one or more image signal processing circuits are further configured to:

synchronize image adjustment settings for the first and second images based on the first and second image statistics information within the overlapping FOV area in response to determining that the first image sensor is not currently occluded.

8. The circuit of claim 7, wherein synchronizing the image adjustment settings for the first and second images based on the first and second image statistics information within the overlapping FOV area comprises matching color, tone mapping, brightness, or noise between the first and second images.

9. The circuitry of claim 7, wherein the one or more image signal processing circuits are further configured to:

synchronize additional image adjustment settings for the first and second images based on the first and second image statistics information within a total field of view (FOV) area equal to a union of the first field of view and the second field of view in response to determining that the first image sensor is not currently occluded.

10. The circuitry of claim 9, wherein the one or more image signal processing circuits are further configured to:

estimate a type of light source in the first and second images, wherein the estimated type of light source comprises a single light source that is used for global white balancing correction for the first and second images or multiple light sources that are used for spatially-varying white balancing correction for the first and second images.

11. The circuitry of claim 1, wherein the first image has a first field of view and the second image has a second field of view different from the first field of view, and wherein the one or more image signal processing circuits are further configured to:

synchronize image adjustment settings for the first and second images based on the first and second image statistics information within a total field of view (FOV) area equal to a union of the first field of view and the second field of view in response to determining that the first image sensor is not currently occluded.

12. A non-transitory computer-readable storage medium storing one or more programs configured to be executed by one or more processors, the one or more programs including instructions for:

receiving a first image of an environment from a first image sensor;

receiving a second image, different than the first image, of the environment from a second image sensor;

obtaining first image statistics information associated with the first image of the environment;

obtaining second image statistics information associated with the second image of the environment;

determining whether the first image sensor is currently occluded by comparing the first image statistics information with the second image statistics information; and synchronizing settings associated with the first and second images based on the comparison of the first image statistics information with the second image statistics information in response to determining that the first image sensor is currently occluded.

13. The non-transitory computer-readable storage medium of claim 12, wherein the instructions for synchronizing the settings associated with the first and second images comprises instructions for synchronizing image adjustment settings for adjusting the first and second images.

14. The non-transitory computer-readable storage medium of claim 13, wherein the instructions for synchronizing the image adjustment settings for the first and second images comprises instructions for synchronizing one or more of: exposure settings, color correction settings, and tone curve settings for the first and second images.

15. The non-transitory computer-readable storage medium of claim 12, wherein the instructions for synchronizing the settings associated with the first and second images comprises instructions for synchronizing image sensor settings for controlling the first and second image sensors.

16. The non-transitory computer-readable storage medium of claim 15, wherein the instructions for synchronizing the image sensor settings for controlling the first and second image sensors comprises instructions for synchronizing one or more of:

autoexposure (AE) settings, automatic white balancing (AWB) settings, and autofocus (AF) settings for the first and second image sensors.

17. The non-transitory computer-readable storage medium of claim 12, wherein the instructions for determining whether the first image sensor is currently occluded comprises instructions for comparing one or more of brightness information, thumbnail information, color information, focus information, and first integration time associated with the first image with one or more of brightness information, thumbnail information, color information, focus information, and second integration time associated with the second image.

18. A method comprising:

receiving a first image from a first image sensor;

receiving a second image, different than the first image, from a second image sensor;

obtaining first image statistics information associated with the first image and obtaining second image statistics information associated with the second image;

determining whether the first image sensor is currently occluded by comparing the first image statistics information with the second image statistics information; and in response to determining that the first image sensor is currently occluded, synchronizing settings associated with the first and second images based on the second image statistics information.

19. The method of claim 18, further comprising:

in response to determining that the first image sensor is currently occluded, filling a portion of the first image with a portion of the second image.

20. The method of claim 18, wherein the first image has a first field of view and the second image has a second field of view different than the first field of view, and wherein the first field of view and the second field of view coincide in an overlapping field of view (FOV) area, the method further comprising:

in response to determining that the first image sensor is not currently occluded, synchronizing image adjustment settings for the first and second images based on the first and second image statistics information within the overlapping FOV area.

21. The method of claim 20, wherein synchronizing the image adjustment settings for the first and second images based on the first and second image statistics information within the overlapping FOV area comprises matching color, tone mapping, brightness, or noise between the first and second images.

22. The method of claim 20, further comprising:

in response to determining that the first image sensor is not currently occluded, synchronizing additional image adjustment settings for the first and second images based on the first and second image statistics information within a total field of view (FOV) area equal to a union of the first field of view and the second field of view.

23. The method of claim 22, wherein synchronizing the additional image adjustment settings for the first and second images based on the first and second image statistics information within the total FOV area comprises estimating a type of light source in the first and second images.

24. The method of claim 18, wherein the first image has a first field of view and the second image has a second field of view different than the first field of view, the method further comprising:

in response to determining that the first image sensor is not currently occluded, synchronizing image adjustment settings for the first and second images based on the first and second image statistics information within a total field of view (FOV) area equal to a union of the first field of view and the second field of view.

25. The method of claim 18, further comprising:

in response to determining that the first image sensor is not currently occluded, synchronizing the settings associated with the first and second images while excluding some of the first image statistics information associated with at least a portion of the first image or excluding some of the second image statistics information associated with at least a portion of the second image.

26. The method of claim 18, wherein the first image statistics information is processed based on a spatial weight map that assigns varying weights to different portions of the first image, and wherein the spatial weight map assigns greater weights to a center portion of the first image, to a portion of the first image aligned with a user's point of gaze, or to a portion of the first image having a light source.

27. The method of claim 18, wherein synchronizing the settings associated with the first and second images comprises synchronizing image adjustment settings for adjusting the first and second images.

28. The method of claim 27, wherein synchronizing the image adjustment settings for adjusting the first and second images comprises synchronizing one or more of: exposure settings, color correction settings, and tone curve settings for the first and second images.

29. The method of claim 27, wherein synchronizing the settings associated with the first and second images further comprises synchronizing image sensor settings for controlling the first and second image sensors.

30. The method of claim 29, wherein synchronizing the image sensor settings comprises synchronizing one or more of: autoexposure (AE) settings, automatic white balancing (AWB) settings, and autofocus (AF) settings for the first and second image sensors.

31. The method of claim 18, wherein determining whether the first image sensor is currently occluded comprises:

comparing one or more of brightness information, thumbnail information, color information, focus information, and first integration time associated with the first image with one or more of brightness information, thumbnail information, color information, focus information, and second integration time associated with the second image.

* * * * *